(12) United States Patent
Barber et al.

(10) Patent No.: US 8,638,104 B2
(45) Date of Patent: Jan. 28, 2014

(54) METHOD FOR DETERMINING SPATIAL DISTRIBUTION OF FLUID INJECTED INTO SUBSURFACE ROCK FORMATIONS

(75) Inventors: Thomas D. Barber, Houston, TX (US); Barbara I. Anderson, Brookfield, CT (US); Reza Taherian, Sugar Land, TX (US); Martin G. Luling, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 391 days.

(21) Appl. No.: 12/817,930

(22) Filed: Jun. 17, 2010

(65) Prior Publication Data

US 2011/0309835 A1  Dec. 22, 2011

(51) Int. Cl.
*G01V 3/00* (2006.01)
(52) U.S. Cl.
USPC .......................................... 324/338; 324/353
(58) Field of Classification Search
USPC ................................................. 324/338, 353
See application file for complete search history.

(56) References Cited

U.S. PATENT DOCUMENTS

| 4,491,796 A | 1/1985 | Smith |
| 5,151,658 A | 9/1992 | Muramatsu et al. |
| 2006/0102345 A1 | 5/2006 | McCarthy et al. |
| 2009/0288820 A1 | 11/2009 | Barron et al. |

OTHER PUBLICATIONS

Anderson et al., "Observations of Large Dielectric Effects on Induction Logs, or, Can Source Rocks be detected with Induction Measurements?", SPWLA 47th Annual Logging Symposium, Veracruz, MX (Jun. 4-7, 2006).
Anderson et al., "Identifying Potential Gas-producing Shales from Large Dielectric Permittivities measured by Induction Quadrature Signals," SPWLA 49th Annual Logging Symposium, Edinburgh, Scotland (May 25-28, 2008).
Klein et al., "Mineral Interfacial processes in the Method of Induced Polarization," Geophysics v. 49, No. 7, pp. 1105-1114 (1984).
Wong, "An Electrochemical Model of the Induced Polarization Phenomena in Disseminated Sulfide Ores," Geophysics v. 44, n. 7, pp. 1245-1265 (1979).
Wong et al., "Induced Polarization in Disseminated Sulfide Ores containing elongated Mineralization," Geophysics v. 46, No. 9, pp. 1258-1268 (1981).
Davydycheva et al., "Electrical-Prospecting Method for Hydrocarbon Search using the Induced-polarization Effect," Geophysics v. 71, No. 4, pp. 179-189 (Jul.-Aug. 2006).
Slater et al., "Controls on Induced Polarization in Sandy Uncolsolidated Sediments and Application to Aquifer Characterization," Geophysics v. 68, No. 5, pp. 1547-1558 (2003).
International Search Report dated Feb. 17, 2012 for International Application No. PCT/US2011/039258.

*Primary Examiner* — Reena Aurora
(74) *Attorney, Agent, or Firm* — Kenneth Liu; Jeremy Berman

(57) ABSTRACT

A method for determining spatial distribution of fluid injected into a subsurface rock formation includes injecting the fluid into the rock formation. The fluid includes therein electrically conductive solid particles dispersed in an electrolyte. An electromagnetic response of the formation is measured. The measured electromagnetic response is used to determine spatial distribution of the injected fluid.

23 Claims, 3 Drawing Sheets

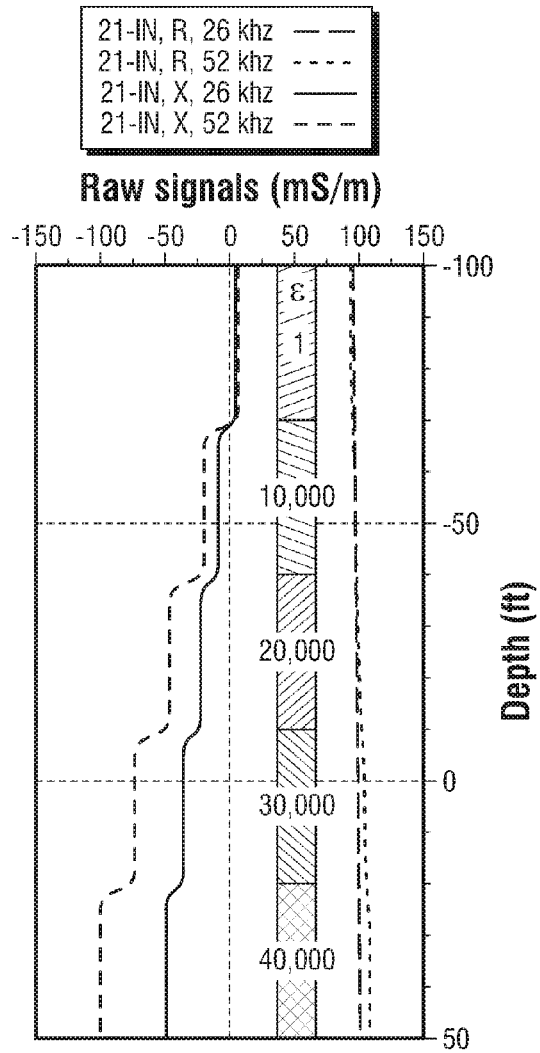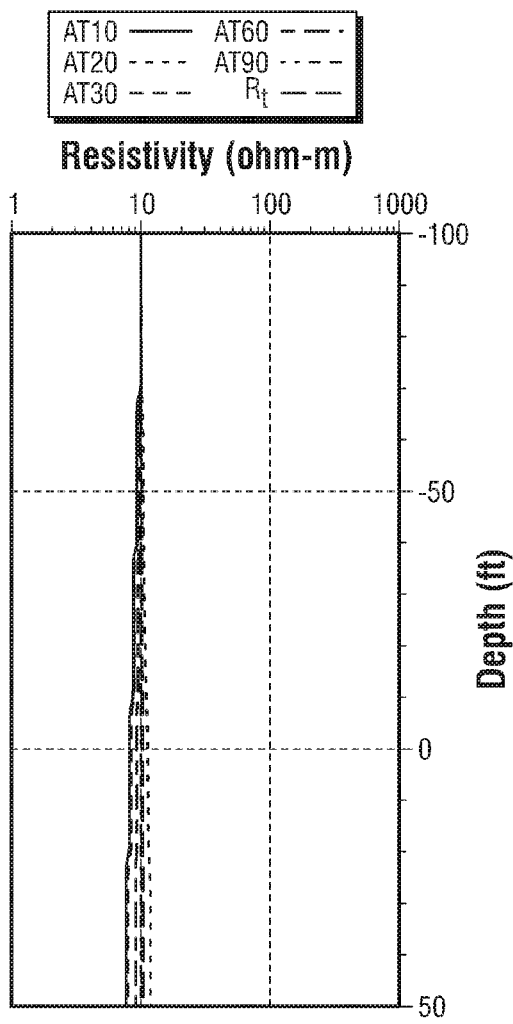
FIG. 4A
FIG. 4B

METHOD FOR DETERMINING SPATIAL DISTRIBUTION OF FLUID INJECTED INTO SUBSURFACE ROCK FORMATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of mapping spatial distribution with respect to time of fluids injected into subsurface rock formations. More specifically, the invention relates to methods for determining spatial distribution of an injected fluid in rock pore spaces when electrical conductivity contrast between the native (connate) fluid and the injected fluid is insufficient for conductivity based fluid mapping.

2. Background Art

Fluids are injected into subsurface rock formations for a number of different purposes, for example, to flush hydrocarbon from pore spaces in the formations and to move contamination or help remediate rock formations in environmental clean-up situations. For many such purposes, it is desirable that the spatial distribution of the injected fluid is determined or mapped as a function of time. If there is sufficient electrical resistivity (conductivity) contrast between the injected fluid and the existing fluid in the rock formation pore spaces, then the electrical resistivity of the formation containing the injected fluid will differ from that of the surrounding formation containing native fluid. In such cases, surface or borehole electromagnetic ("EM") measurement methods (e.g., galvanic or induction) can be used to map the spatial distribution of fluid movement and the fluid front with respect to time.

However, in a number of instances there is not a large enough resistivity/conductivity contrast between the injected fluid and fluid in the surrounding rock formation in order to use EM mapping techniques known in the art.

It is also known in the art to impart injected fluid with detectable characteristics to physically distinguish the injected fluid from the fluid already present in the pore spaces of an injection formation. One example of such technique is to include a radioisotope in the injected fluid that can be monitored by a suitable radiation detector. However, use of radioisotopes may be prohibited in certain areas, and their range of detectability through rock formations is generally limited to a distance of about one foot from the radiation detector.

There is a need for other methods to be able to map the spatial distribution of the injected fluid.

SUMMARY OF THE INVENTION

A method according to one aspect of the invention for determining spatial distribution of fluid injected into a subsurface rock formation includes injecting the fluid into the rock formation. The fluid includes therein electrically conductive solid particles dispersed in an electrolyte. An electromagnetic response of the formation is measured. The measured electromagnetic response is used to determine spatial distribution of the injected fluid.

Other aspects and advantages of the invention will be apparent from the following description and the appended claims.

BRIEF DESCRIPTION OF THE DRAWINGS

FIG. 4 shows simulated array induction resistivity values for various values of dielectric permittivity in a 10 ohm-m rock formation.

DETAILED DESCRIPTION

Figure 1:
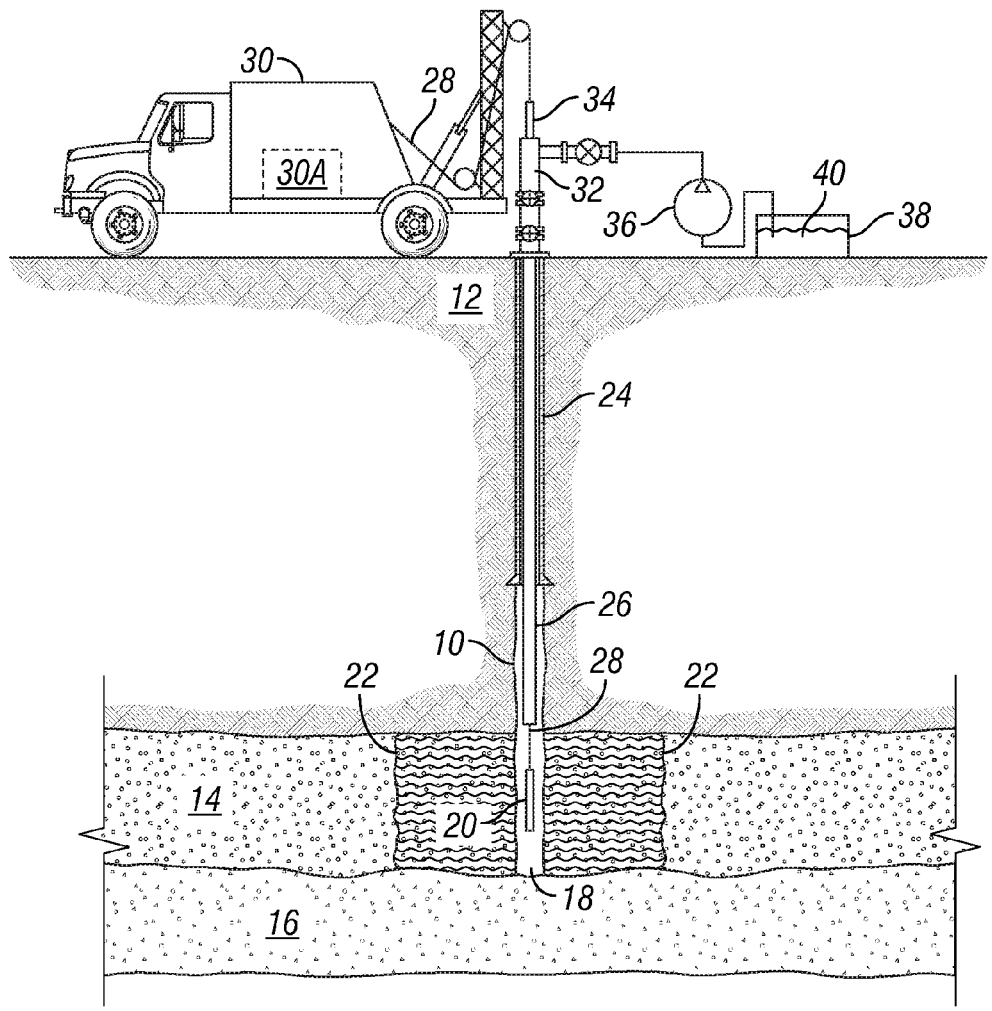
FIG. 1 shows an example borehole EM measuring instrument in a wellbore drilled through an injection formation, and a pump system configured to inject a selected fluid into the injection formation.

An example of injecting fluid into a subsurface formation through a wellbore and making EM measurements from within the same or different wellbore is shown schematically in FIG. 1. A wellbore 10 that may be used for fluid injection is drilled through subsurface rock formations, shown generally at 12, and into or through an injection formation 14. As explained in the Background section herein, the injection formation 14 is one in which fluid is to be injected, for example, to displace hydrocarbon or contaminants, and/or to maintain fluid pressure in the formation 14. It is desirable in certain circumstances to be able to determine the spatial distribution of the injected fluid and its boundary or "front" 22 with respect to fluids already present in the pore spaces of the injection formation 14.

The example wellbore 10 may include a pipe or casing 24 cemented in place to a selected depth to protect shallower formations from fluid entry and to maintain the mechanical integrity of the wellbore 10. In some examples, a tubing 26 may be inserted into the interior of the casing 24 to increase the velocity of fluid pumped from the surface.

Fluid to be pumped into the formation may be stored, at 40, in a tank or pit 38 at the surface. A pump 36 lifts the fluid from the tank 38 and discharges it under selected pressure into a wellhead 32 which includes control valves for maintaining hydraulic control of the wellbore 10. In the present example, the fluid 40 may travel through the tubing 26 and be discharged from the wellbore 10 into the injection formation 14. In some examples, the wellbore may extend, as shown at 18, to the depth of the bottom of the injection formation 14, bounded on the bottom by another rock formation 16. Other wellbores may extend deeper and may include casing all the way to the bottom of the wellbore 10. The configuration shown in FIG. 1 is only meant to serve as an example of fluid injection into a subsurface rock formation and is not intended to limit the scope of the present disclosure and/or invention.

In some examples, measurement of an electromagnetic property of the injection formation 14 may be performed by an instrument 20 extended into the wellbore 10. The instrument may be, for example, an EM induction resistivity measurement instrument, for example one used to provide services under the service mark AIT, which is a mark of the assignee of the present invention. The EM induction instrument 20 in the present example may be conveyed into the wellbore 10 at the end of an armored electrical cable 28. The cable 28 may include one or more insulated electrical conductors to supply electrical power to the instrument 20 and to transmit signals from the instrument 20 to a surface recording unit 30, having a data recorder/processor 30A therein for recording and interpreting the signals transmitted over the cable 28 by the instrument 20. If the instrument 20 is used contemporaneously with fluid injection as shown in FIG. 1, a pack off/lubricator 32 or similar combination of cable pressure seal and instrument receiving conduit may be coupled to the upper part of the wellhead 32. The pack off/lubricator enables movement of the cable 28 while preventing escape of fluid under pressure from the wellhead 32 and the wellbore 10.

The example shown in FIG. 1 is based on the land surface, however, those skilled in the art will readily appreciate that corresponding equipment may be used to perform similar operations on wellbores below the bottom of a body of water such as a lake or ocean.

As explained in the Background section herein, the spatial distribution of fluid, shown as within the fluid front 22, can be readily mapped using an instrument such as the one shown in and described with reference to FIG. 1 if there is substantial contrast in resistivity between the pumped fluid 40 and the fluid already present in the pore spaces of the injection formation 14. The present invention can also relate to the situation where such resistivity contrast is not present. Methods according to the invention may be configured to create a detectable EM phenomenon by injecting, along with the fluid 40, micro-scale, electrically conductive particles. The electrically conductive particles produce an induced-polarization ("IP") effect that can be measured with a suitable apparatus. Examples of suitable conductive particles are fine-grained metallic powders or carbon nanotubes. From the surface, inductive or galvanic methods can be used to measure the IP spatial distribution, and thereby the injected fluid front. From within wellbores, such as shown in FIG. 1, induction tools operating in the tens of kHz frequency range can be used to map the fluid distribution. The spatial distribution of the conductive particle-filled fluid can then be determined by mathematical inversion methods as solutions to Maxwell's Equations.

The Induced Polarization (IP) effect is produced in a porous subsurface rock formation when the formation contains both salt water and particles having metallic conductivity. See, Anderson, B., Barber, T., Lüling, M., and Sen, P.: *Observations of large dielectric effects on induction logs, or, can source rocks be detected with induction measurements?*, SPWLA 47$^{th}$ Annual Logging Symposium, Veracruz, Mexico, Jun. 4-7, 2006. Naturally-occurring electrically conductive particles that fit this description include pyrite and graphite. The observed effects of IP include a large apparent dielectric effect on the measurements made by induction tools having transmitter frequency in the tens of kHz range. The induction quadrature (X) signals and in phase (R) signals are perturbed by the IP effect. The raw R and X signals can be inverted to provide the apparent conductivity and apparent dielectric permittivity of the rock formation. See, Anderson, B., Barber, T., Lüling, M., Sen, P., Taherian, R., and Klein, J.: *Identifying potential gas producing shales from large dielectric permittivities measured by induction quadrature signals*, SPWLA 49$^{th}$ Annual Logging Symposium, Edinburgh, Scotland, May 25-28, 2008.

Figure 2:
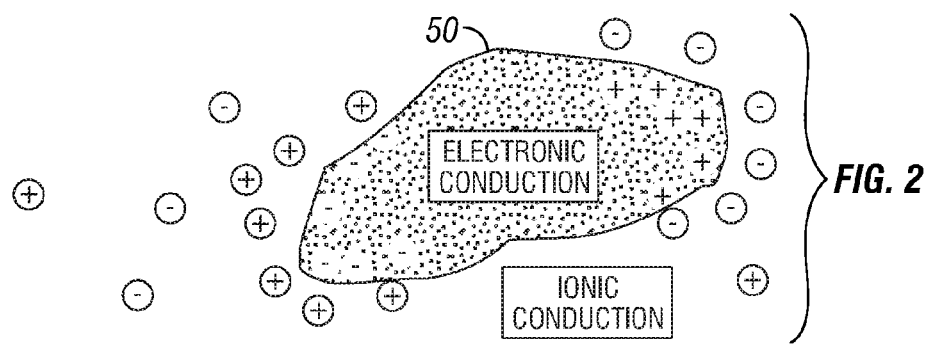
FIG. 2 shows an example of induced polarization adjacent to an electrically conductive particle suspended in an electrolytic fluid.

In the presence of electrically conductive particles, oxidation-reduction reactions on the particle surfaces (which happen during the transition of the electric current from moving as a result of ionic conduction in the formation water to moving by electron conduction within the electron structure of the particles) can result in similar large values of dielectric permittivities in induction measurements made in the kHz range. FIG. 2 shows schematically the source of apparent over-voltage as a result of redox (or IP) in an electrically conductive particle 50 disposed in a source shale 42. In such situations, metallic grains (pyrite, etc.) are in contact with electrolytes (water containing various salts). In the presence of an electric field, electric currents flow in the system. The conduction is by ions in the electrolyte, but by electrons inside the electrically conductive particle grain 50. Oxidation is defined as the loss of an electron to a negative ion in solution, such as $Cl^-$. Reduction is defined as the uptake of an electron by a positive ion, such as $Na^+$. High dielectric permittivities are caused by an accumulation of ions and gases on the electrolyte side of the interface between the conductive particle and the electrolyte. See, for example, Klein, J. D., Biegler, T., and Horne, M. D., 1984, *Mineral interfacial processes in the method of induced polarization*, Geophysics, vol. 49, no. 7, p. 1105-1114.

Using data quoted in Wong, J., 1979, *An electrochemical model of the induced polarization phenomena in disseminated sulfide ores*, Geophysics, vol. 44, no. 7, p. 1245-1265 and Wong, J., and Strangway, D. W., 1981, *Induced polarization in disseminated sulfide ores containing elongated mineralization*, Geophysics, vol. 46, no. 9, p. 1258-1268, observed dielectric permittivities can be as much as 1000 for even a small volume fraction of electrically conductive particles dispersed in electrolyte.

The magnitude of the dielectric permittivity effect on induction tools can be derived from simple induction response equations. The multi-frequency array induction tool provides deep (in the sense of lateral displacement from the axis of the wellbore) conductivity measurements using two operating frequencies: 26 kHz and 52 kHz. For the foregoing frequencies, the conductivity scale $\sigma_0 = \omega_0 \epsilon_0$ becomes $$f_1 = 26 \text{ kHz} \Rightarrow \sigma_0^{(1)} \cong 1.45 \text{ }\mu S/m$$

$$f_2 = 52 \text{ kHz} \Rightarrow \sigma_0^{(2)} \cong 2.90 \text{ }\mu S/m$$

These values are two orders of magnitude below the lower end of the conductivity range. As a result, it can be inferred that relative dielectric permittivities of $\epsilon_r > 10000$ will produce observable dielectric effects on the induction instrument response.

Elementary three-coil induction tools are designed to directly measure the electric conductivity. Electromagnetic signals are described by a wave number $k = \sqrt{\omega\mu(\omega\epsilon + i\sigma)} = \sqrt{i\omega\mu\sigma^*}$. Induction tools and their data-reduction algorithms are designed in such a way that the square of this wave number is directly detected to provide the conductivity as a real term, $$\frac{k^2}{i\omega\mu} = \sigma^* = \sigma - i\omega\varepsilon$$

In calculating conductivity of formations from the above relationships, usually the dielectric permittivity is neglected, so that any imaginary term only provides a small, positive, higher-order "skin-effect" correction in very conductive media.

FIG. 4 shows the AIT response computed for five values of $\in_r$: 1, 10,000, 20,000, 30,000 and 40,000. These values are within the range observed in a rock formation known as the Woodford shale. $R_t$ was set to 10 ohm-m in all formation layers. The left track in FIG. 4 shows the raw R- and X-signals for the 21-inch longitudinal spaced (i.e., distance between transmitter and receiver) array in the AIT at 26 and 52 kHz. The right track shows the five processed apparent resistivity curves. The center-bed values of the raw R- and X-signals are given in Table 1. The raw X-signal curves are proportional to the operating frequencies and differ by approximately a factor of 2. The raw R-signal curves cross and separate as $\in_r$ increases. The processed apparent resistivity curves separate and systematically depart from 10 ohm-m as $\in_r$ increases.

TABLE 1

Center-bed R- and X-signals (mS/m) for the five values of $\epsilon_r$ in FIG. 2

| $\epsilon_r$ | R at 26 kHz | R at 52 kHz | X at 26 kHz | X at 52 kHz |
|---|---|---|---|---|
| 1 | 95.3 | 93.3 | 4.5 | 6.3 |
| 10,000 | 96.2 | 96.1 | −9.2 | −20.2 |
| 20,000 | 97.3 | 99.5 | −22.7 | −46.9 |
| 30,000 | 98.5 | 103.4 | −36.4 | −74.0 |
| 40,000 | 99.7 | 107.8 | −50.3 | −101.1 |

Where boreholes are drilled into the formation of interest (i.e., injection formation 14 in FIG. 1), wellbore measurement techniques such as shown in FIG. 1 enable the detection and mapping of the IP-producing fluid/conductive particle distribution. Note that the disclosed methods are not limited to the existing induction tools and in particular induction tools operating at higher or lower frequencies can be used. As the data of Table 1 shows higher frequencies lead to higher signals. On the other hand the dielectric permittivity increases with decreasing frequency so that there is an optimum frequency which depends on the properties of the injected material. Additionally, the present disclosure is not limited to induction tools in general. Rather, as will be recognized by one or ordinary skill in the art having benefit of the present disclosure, methods consistent with the disclosure can be used with propagation tools (such as certain tools without the need for bucking coils to cancel the effect of direct coupling between a transmitter and receiver coil). In certain embodiments, propagation tools may be better suited for methods involving logging-while-drilling applications and induction tools may be better suited for methods involving wireline applications, though as would be recognized by one of ordinary skill in the art, either type of tool could be used in either type application. In order to produce the required IP effects, it is necessary to have the fine particles having solid phase electrical conductivity dispersed in an electrolytic fluid. Where fluids are injected downhole for production enhancement or for environmental remediation, if the injected fluids carry such electrically conductive particles, then wellbore EM induction measurement techniques as explained with reference to FIG. 1 can be used to map the distribution of the injected fluids. Solid phase electrical conductivity, or the term "electrically conductive particles" as used herein is intended to mean any substance that conducts electricity in its solid phase. Examples of such substances include many metals, graphite and pyrite, among others.

Figure 3A:
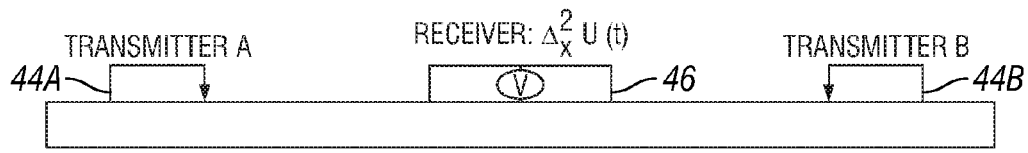
FIG. 3A shows an example surface EM measurement system for mapping spatial distribution of induced polarization.

In certain cases, no wellbores are drilled through the injection formation (14 in FIG. 1) from within which EM induction measurements can be performed. To map the spatial distribution of injected fluids in such cases, surface measurements may be required. One such surface measurement system is described in Davydycheva, S., Rykhlinski, N., and Legeido, P.: *Electrical-prospecting method for hydrocarbon search using the induced-polarization effect, Geophysics,* Vol. 71, No. 4 July-August 2006; p. 179-189. FIG. 3A shows one example of an apparatus to measure the induced polarization distribution from the surface. Another system is shown in Slater, L. D., and Glaser, D. R., 2003, *Controls on induced polarization in sandy unconsolidated sediments and application to aquifer characterization, Geophysics,* 68, No. 5, 1547-1558. The method described in the Davydycheva, et al. publication is particularly adapted to image the IP-producing rock formation layers (e.g., 14 in FIG. 1).

In the method described in the Davydycheva et al publication, electromagnetic transmitters, oriented along the horizontal x-axis, as depicted in FIG. 3A at 44A and 44B, have selected frequency alternating current or appropriately switched direct current (e.g., switched on, switched off, reversed polarity or a sequence such as a pseudo random binary sequence) passed across the grounded electrodes to excite an electromagnetic field in the formation. In the present example, the transmitters may be electric dipoles. The moments of the transmitter dipoles are opposite to each other. The distance between the transmitters 44A, 44B can vary depending on the desired vertical depth of investigation. A receiver 46 can be placed at the surface at the midpoint between the transmitters 44A, 44B and in the present example may consist of three equidistant grounded electrodes, so that the first and the second spatial differences of the electric potential can be measured.

If U is the potential of the electric field, then the voltmeter depicted in FIG. 3A measures the voltage equal to $(U_1−2U_2+U_3)/2$ which is the second potential difference between the electrodes 1, 2, and 3 (numbered in a sequential order) divided by two. Thus, the depicted receiver 46 is a quadrupole.

In other examples, the transmitters 44A, 44B and/or the receiver 46 may be wire loops or coils, solenoids or other form of magnetic dipole. Thus, electromagnetic measurement usable with the present invention is not limited in scope to electric dipole transmitters and receivers.

The axial current, which is strong in the vicinity of each transmitter 44A, 44B, can be negligibly small in the area of the receiver 46, so that the vertical current prevails in the formation below the receiving electrodes as shown by the arrows in FIG. 3B, for example. Moreover, the second potential difference $\Delta_x^2 U$ measured by the receiver 46 is exactly proportional to the total vertical current below it. Indeed, because $\nabla \cdot j = 0$ at the receiver location, and the component on the axis of the transmitting dipoles can be neglected, we can apply Stokes' theorem $\oint \mathbf{j} \cdot ds = 0$ to the area from x to x+Δx along the x-axis and from 0 to some depth Δz along z, as follows:

$$\Delta_x^2 U = \Delta_x U(x+\Delta x) - \Delta_x U(x) : [J_x(x+\Delta x) - J_x(x)]\Delta z = \int_x^{x+\Delta x} J_z(x)dx,$$

where $J_x$ and $J_z$ represent the linear current densities along the x- and z-directions, respectively. In other words, the quantity is sensitive to the vertical current directed downward, from the receiver area to deep structures. In this way, a vertical current focusing can be realized. The sensitivity of the receiver 46 is shown by the arrows in FIG. 3C. Below will be described in detail two different ways to perform such focusing two transmitters. The arrangement for measuring shown in FIG. 3A allows the elimination of the effect of the near-surface inhomogeneities and of the adjacent formations, which are generally large for conventional resistivity methods.

With measurement systems available that are sensitive to the IP effect, the basic technique for determining spatial distribution of the injected fluid is a) dispersing microparticles having metallic conductivity within the injected fluid to produce a strong IP effect; and b) using known techniques to measure the IP effect to map the spatial distribution of the injected fluids in the rock formation.

Electrically conductive particles, for example, are not normally soluble in water and if they are injected into the formation they will precipitate within a short distance from the injection point. For the particles to move with the injecting fluid, the particles need to be made soluble or suspended in the injection fluid. Techniques for solubilization of metal particles so that they can be mixed with water and injected into the injection formation (14 in FIG. 1) are described in, Journal of Materials Chemistry, 2007, volume 17, p. 613 for example. The method described in the foregoing article uses clay minerals to solubilize metal particles. The presence of clay and metal together is expected to enhance the IP effect even further beyond that provided by the metal particles alone. Alternatively, the electrically conductive particles can be embedded within a micelle to make them soluble in the injection fluid and the micelles may be made to be water or oil soluble depending on the type of injection fluid used. As will be explained further below, the particles may alternatively be suspended in the injected fluid.

One electrically conductive microparticle type that may be used in some examples is carbon nanotubes. These have the required electrical conductivity and have been proposed as carriers for chemical or biological agents in the earth for environmental remediation. Although carbon nanotubes are also not normally soluble in water, they can be modified to render them water soluble. See for example, J Am. Chem. Soc. 2006 Jan. 11; 128(1):95-9. Carbon nanotube particles have been shown to be water soluble without any loss of electrical conductivity.

In practice a suitable amount of solubilized carbon nanotubes or metal particles are dissolved in the injection fluid and the resulting solution is injected into the formation (e.g., into formation 14 as shown in FIG. 1). Measurements may be made both before the fluid injection and during the course of the fluid injection. A wellbore induction (FIG. 1) or surface to borehole measurement (see FIG. 3A) is typically performed before the injection starts to obtain a background map, and the measurements may be repeated at selected times based on the desired time and spatial resolution. The surface to borehole measurement is inherently a multi point measurement and provides a sufficient number of measurements for generating an IP map of the region of interest. The wellbore induction instrument however, provides fewer measurements, but such measurements can be made along the wellbore (i.e., as a function of wellbore measured depth) in order to provide more data points. A preferred method is to measure a combination of both techniques, namely, perform the surface to borehole measurement in addition to wellbore induction measurement with respect to depth in both injection and production wells. The surface to borehole EM measurement will have greater depth of investigation than the wellbore induction measurements, but lower resolution. Thus a simultaneous inversion of all measurements can provide a map of the fluid front in the injection formation (14 in FIG. 1) with enhanced resolution close to any wellbore in which induction measurements are made.

It is also possible to add chemicals to cause the electrically conductive particles, whether metal particles, carbon nanostructures or other conductive particles, to be suspended in the injected fluid. Thus, dissolving the particles through solubilization is only one possible technique for dispersing the particles in the injected fluid.

Figure 3B:
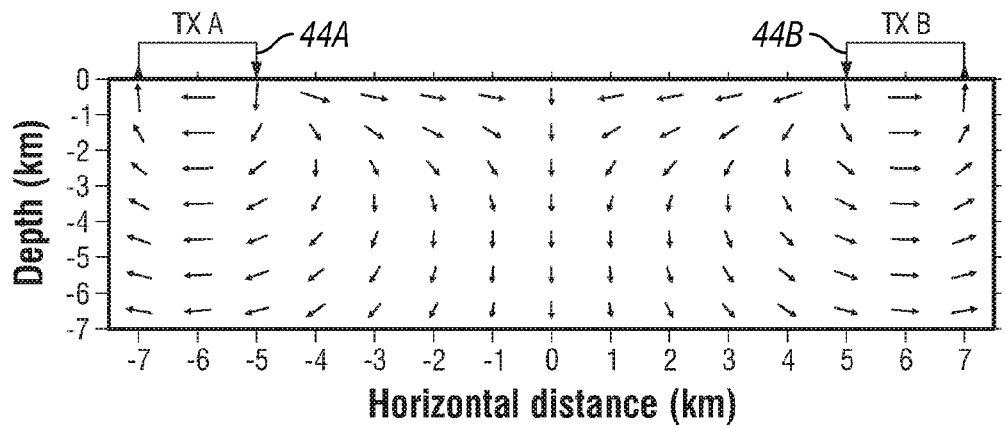
FIG. 3B shows electric current distribution in the subsurface resulting from the transmitter arrangement shown in FIG. 3A.
Figure 3C:
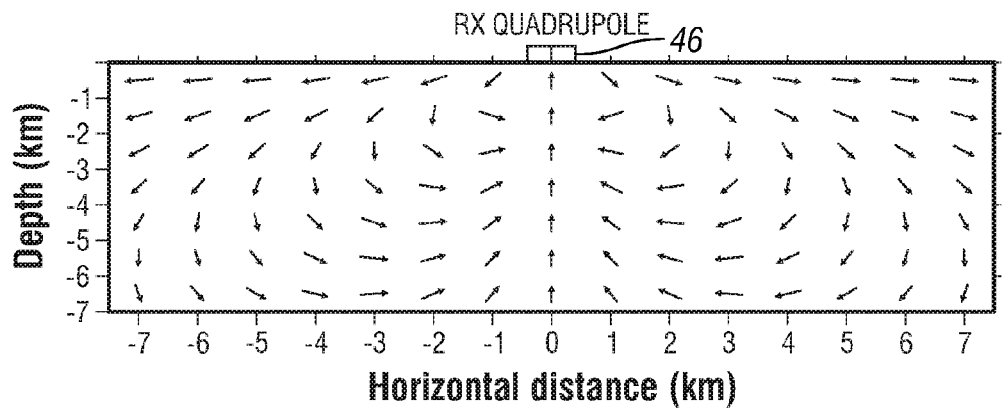
FIG. 3C shows receiver sensitivity for the arrangement shown in FIG. 3A.
Figure 3D:
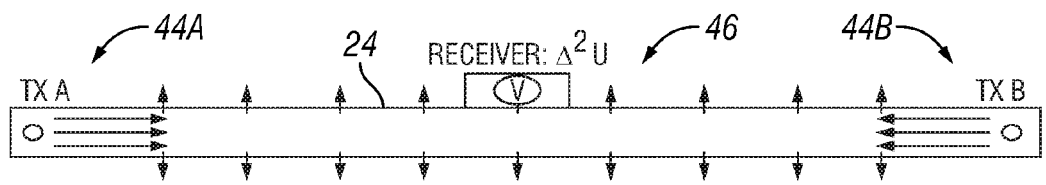
FIG. 3D shows an example through casing resistivity measurement arrangement.

FIG. 3D shows an example configuration for measuring electromagnetic response where an electrically conductive casing is disposed in the wellbore. Two spaced apart transmitters 44A, 44B are disposed along the casing, and a quadrupole receiver 46 as explained with reference to FIG. 3A may be provided proximate a center point between the transmitters 44A, 44B.

In addition to the measurements made from within a wellbore as shown in FIG. 1, surface measurements shown in FIGS. 3A, 3B and 3C, and combinations of the foregoing two types of measurements, in other examples, measurements may be made using a wellbore instrument such as shown in FIG. 1 disposed in each of two or more wellbores substantially simultaneously. Thus, a plurality of induction measurements made as explained with reference to FIG. 1 may be used to map the spatial distribution of the pumped fluid, both at any single time and with respect to time.

Methods according to the various aspects of the invention may enable mapping spatial distribution of injected fluid and its changes with respect to time wherein electrical resistivity or other techniques that provide contrast between the injected fluid and the existing pore fluid in a rock formation are not applicable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining spatial distribution of fluid injected into a subsurface rock formation, comprising:
   injecting the fluid into the rock formation, the fluid including therein electrically conductive solid particles dispersed in an electrolyte;
   measuring an electromagnetic response of the formation; and
   using the measured electromagnetic response to determine spatial distribution of the injected fluid in the rock formation.

2. The method of claim 1 further comprising measuring an electromagnetic response of the rock formation before injecting the fluid.

3. The method of claim 1 further comprising continuing to inject the fluid; and
   at selected times, repeating the steps of measuring electromagnetic response and determining spatial distribution of the injected fluid.

4. The method of claim 3 further comprising generating a time based map of the spatial distribution of the injected fluid.

5. The method of claim 1 wherein the electrically conductive particles comprise carbon nanotubes.

6. The method of claim 5 wherein the carbon nanotubes are solubilized prior to inclusion in the injection fluid.

7. The method of claim 1 wherein the electrically conductive particles comprise metal particles.

8. The method of claim 7 wherein the metal particles are solubilized prior to inclusion in the injection fluid.

9. The method of claim 1 wherein the measuring electromagnetic response comprises measuring electromagnetic induction response using an instrument disposed in a wellbore penetrating the rock formation.

10. The method of claim 9 further comprising moving the instrument along the wellbore to obtain induction measurements with respect to depth in the wellbore.

11. The method of claim 9 wherein the measuring electromagnetic induction response comprises detecting induced polarization resulting from the presence of the conductive particles in an electrolyte.

12. The method of claim 1 wherein the measuring electromagnetic response comprises inducing an electromagnetic field proximate the Earth's surface and detecting response of subsurface formations including the rock formation to the induced electromagnetic field.

13. The method of claim 12 wherein the inducing the electromagnetic field comprises passing electric current through a spaced apart pair of grounded dipole transmitters.

14. The method of claim 12 wherein the detecting response comprises measuring voltages across a grounded quadrupole receiver disposed substantially at a midpoint of the transmitters.

15. The method of claim 12 wherein the electric current comprises one of alternating current and switched direct current.

16. The method of claim 15 wherein the switched direct current comprises at least one of switching the current on, switching the current off, reversing the current polarity and switching in a selected sequence.

17. The method of claim 12 wherein the inducing the electromagnetic field comprises passing electric current through a spaced apart pair of wire coils.

18. The method of claim 1 wherein the measuring electromagnetic response comprises both measuring electromagnetic induction response using an instrument disposed in a wellbore penetrating the rock formation and inducing an electromagnetic field proximate the Earth's surface and detecting response of subsurface formations including the rock formation to the induced electromagnetic field.

19. The method of claim 1 wherein the determining spatial distribution comprises inverting the measurements to obtain a solution to Maxwell's equations.

20. The method of claim 1 wherein measuring electromagnetic response comprises measuring electromagnetic response using an instrument disposed in each of at least two separate wells.

21. The method of claim 1 wherein measuring electromagnetic response comprises measuring electromagnetic response using an instrument disposed in a well and an instrument disposed at a surface location.

22. The method of claim 1 wherein an induction tool is used to measure electromagnetic response.

23. The method of claim 1 wherein a propagation tool is used to measure electromagnetic response.

* * * * *